Figure 1:
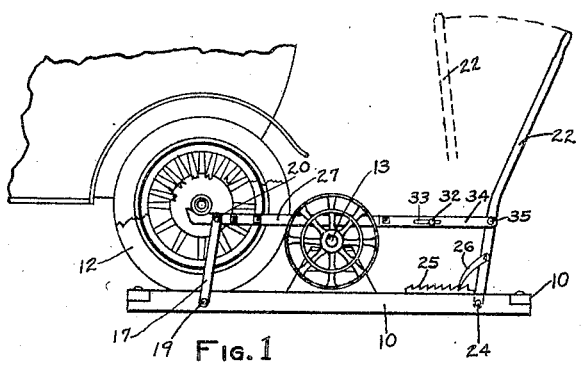

Aug. 21, 1923.

G. D. VANNEST 1,465,382

POWER TRANSMISSION DEVICE

Filed May 25, 1922

George D. Vannest
INVENTOR.

BY
U. G. Charles
ATTORNEY.

Patented Aug. 21, 1923.

1,465,382

UNITED STATES PATENT OFFICE.

GEORGE D. VANNEST, OF PONCA CITY, OKLAHOMA.

POWER-TRANSMISSION DEVICE.

Application filed May 25, 1922. Serial No. 563,665.

*To all whom it may concern:*

Be it known that I, GEORGE D. VANNEST, a citizen of the United States, and a resident of Ponca City, in the county of Kay and State of Oklahoma, have invented certain new and useful Improvements in a Power-Transmission Device, of which the following is a description, referring to the drawings which accompany this specification.

Figure 3:
Figure 4:
Figure 2:
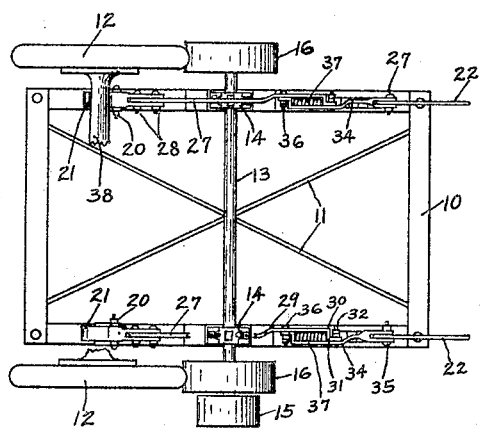

The invention relates to a device especially adapted for use by farmers, mechanics and the public generally, especially those who owning an automobile, have occasion to need a power equipment for sundry uses, such for instance as operating lathes, band saws, churns, and other varied tools and equipment necessitating under customary practice the purchase of a gas, steam engine or electric motor. By means of my simple and improved device, which is readily manufactured and provided and which can be stored when not in use, the owner can simply employ his automobile engine together with the driving gearing, shafts and rear wheel assembly as the power equipment essential for the operation of the line shaft from which by a belt the power can be transmitted to the tool for operation thereof as will be readily understood, by reference to the accompanying drawings, in which, Fig. 1 is a side elevation of my improved device and showing an automobile in operative position and in combination therewith. Fig. 2 is a plan view of Fig. 1. Fig. 3 is front view of the member of the device for supporting the wheel of the automobile and allied parts. Fig. 4 is a cross section of Fig. 3. Similar numerals of reference indicate corresponding parts throughout all the figures of the drawings.

Referring to the drawings; the frame 10 of my device is preferably rectangular in formation as seen in Fig. 2 and may be of wood or steel construction as preferred and cross bracing 11 may be employed therewith for stability. The rear wheels of the automobile are indicated at 12 and are driven by the engine of the vehicle in the customary manner, either forward or reverse depending upon the engagement of the proper combination in the transmission of the automobile.

The line shaft 13 of the device is mounted in bearings 14 supported from the frame 10 of the device. This line shaft is provided with a belt pulley 15 at its outer end and which may be of any preferred diameter and width. A pair of pulley wheels 16 are also shown affixed on the shaft 13, being spaced apart at the same distance as the pair of rear wheels of the automobile and which as shown in Fig. 2 are brought into driving contact therewith for power transmitting purposes. It is obvious that if the rear wheels are jacked up off the ground and brought into this position as illustrated, that upon their driven rotation, they will serve to rotate the wheels 16, shaft 13 and the pulley 15 affixed thereto and that in this manner a belt leading around the pulley 15 and the drive wheel on the tool to be driven will serve to operate that tool for its desired use.

The jacking feature of the device by which the raising and positioning of the driving wheels of the automobile is accomplished will now be described. A pair of channel-like stud supports 17 have their webs cut away at their opposite ends as at 18, 18, Fig. 3. The lower ends of the studs 17 are pivotally carried by a bolt 19 through the frame 10, the cutaway portions 18 straddling the said frame 10 as clearly understood, while the upper cut away portion of the studs 17, each pivotally engage a bolt 20 carried by a casting 21; each casting 21 having a depressed upper face adapted to engage around the rear axle of the automobile as will be readily understood. A pair of levers, one for each casting 21 are shown at 22, 22, each being pivotally supported at 23 by bolt means 24 on the frame 10. On the frame 10 are located ratchet elements 25 which engage the pawls 26 pivoted on the levers 22.

Each lever 22 is linked to a casting 21 in the preferred manner illustrated, in which, a steel bar 27 secured by bolts 28 to the casting 21 is offset at 29, bent at right angles at 30 and again at 31, and the end portion thereof carrying a pin 32 operable in a slot 33 on a similar bar 34 pivoted from the bolt 35 on the lever 22. The bar 34 likewise carries a pin 36 operable in a slot similar to 33 in the bar 27 and by means of these pins the members 27—34 are in proper alignment. A spring 37 is shown in each bar combination.

Fig. 1 shows the device and automobile in operable combination. Previously the lever 22 was extending forward in the dotted position as outlined at 22'; then the automobile was backed up until the axle thereof 38 was immediately above the depressed face of the castings 21, the levers 22 were then drawn rearwardly to the position as illustrated in Fig. 1 so that the leverage system acted as a jack to lift the rear axle 38 and wheels 12 from the ground; it will be noted that this drew the studs 17 a little rearwardly from a vertical position and so that the weight of the car wheels 12 was thrown against the pulleys 16, the wheels 12 still however being off the ground. The springs 37 give resiliency to the combination and the pawls, 26, 26 engaging the ratchet 35 maintain the proper relations of the allied parts. Now when the rear automobile wheels revolve under engine power, it is obvious that they will drive the pulleys 16 and therefore the belt pulley 15 for power transmission purposes. If desired a belt may be employed around the wheel 16 and in direct contact with the automobile tire.

Such modifications may be employed as lie within the scope of the appended claims.

Having fully described my invention, what I now claim as new and desire to secure by Letters Patent is;

1. In a device of the class described, a frame work, a line shaft rotatably mounted in bearings carried by said frame work; a pair of pulleys affixed thereto at predetermined spaced distances apart; a pair of studs pivoted from and above forward portions of the frame and a lever for each stud pivoted from rear portions of the frame, a pawl on said lever and a ratchet block on the frame in operable connection therewith; an axle supporting member for each stud pivotally connected thereto and forwardly projecting therefrom; a member leading rearwardly from each axle supporting member and a member forwardly leading from the corresponding lever and in supported combination with the first member and spring means intermediate end portions of said members and whereby rearward lever movements are resiliently transmitted through said linking elements to pivotally raise the axle supporting members through an arc movement and dispose the stud members rearwardly of a vertical plane taken through the stud supporting elements at its base.

2. In combination, a frame work, a line shaft rotatably mounted in bearings carried by said framework and a belt pulley on said shaft; a pair of studs pivoted from and above forward portions of the frame and a lever for each stud pivoted from rear portions of the frame, a pawl on said lever in operable engagement with a ratchet on said frame work; an axle supporting member for each stud pivotally connected thereto and forwardly projecting therefrom and a resilient connection between each axle supporting member and its corresponding lever; an automobile with its rear axle arranged upon said axle supporting members, a pulley wheel affixed to the line shaft in rear of each automobile wheel; and whereby rearward lever movements operate to lift said rear axle assembly rearwardly and so that the pivoted support of each axle supporting member is drawn behind the vertical axis of the pivoted base support of the studs and so that the weight of the automobile wheels is thrown upon and in friction and driving contact with the said pulley wheels for power transmission purposes.

GEORGE D. VANNEST.